(12) United States Patent
Hawtin et al.

(10) Patent No.: US 6,875,476 B2
(45) Date of Patent: Apr. 5, 2005

(54) METHODS AND APPARATUS FOR MANUFACTURING TURBINE ENGINE COMPONENTS

(75) Inventors: Philip Robert Hawtin, Mid Glamorgan (GB); Michael Smith, South Glam (GB)

(73) Assignee: General Electric Company, Schenectady, NY (US)

( * ) Notice: Subject to any disclaimer, the term of this patent is extended or adjusted under 35 U.S.C. 154(b) by 157 days.

(21) Appl. No.: 10/345,009

(22) Filed: Jan. 15, 2003

(65) Prior Publication Data

US 2004/0134066 A1 Jul. 15, 2004

(51) Int. Cl.$^7$ ................................................. B05D 1/32
(52) U.S. Cl. ...................... 427/448; 427/455; 427/456; 427/236; 427/250; 427/282; 427/287
(58) Field of Search ................................ 427/448, 455, 427/456, 250, 282, 236, 230, 239, 287; 29/889

(56) References Cited

U.S. PATENT DOCUMENTS

| | | | |
|---|---|---|---|
| 3,831,213 A | * | 8/1974 | Bedi ........................... 470/11 |
| 4,259,842 A | | 4/1981 | Koshoffer et al. |
| 4,628,694 A | | 12/1986 | Kelm et al. |
| 4,655,044 A | | 4/1987 | Dierberger et al. |
| 5,113,660 A | | 5/1992 | Able et al. |
| 5,130,163 A | | 7/1992 | Clingman et al. |
| 5,331,816 A | | 7/1994 | Able et al. |
| 5,334,417 A | | 8/1994 | Rafferty et al. |
| 5,553,455 A | | 9/1996 | Craig et al. |
| 5,800,695 A | | 9/1998 | Kang et al. |
| 5,851,679 A | | 12/1998 | Stowell et al. |
| 6,047,539 A | | 4/2000 | Farmjer |
| 6,224,673 B1 | * | 5/2001 | Das et al. ................... 118/500 |
| 6,240,719 B1 | * | 6/2001 | Vondrell et al. .............. 60/223 |
| 6,413,584 B1 | | 7/2002 | Wustman et al. |
| 2003/0232139 A1 | * | 12/2003 | De Tura ..................... 427/282 |

FOREIGN PATENT DOCUMENTS

| | | |
|---|---|---|
| EP | 0136071 | 4/1985 |
| EP | 0493304 | 7/1992 |
| EP | 1076106 A1 | 2/2001 |
| GB | 2009635 A | 6/1999 |
| JP | 59004824 | 11/1984 |
| WO | WO 02/092872 A2 | 11/2002 |
| WO | WO 03/089679 A1 | 10/2003 |
| WO | WO 03/100108 A1 | 12/2003 |

* cited by examiner

*Primary Examiner*—Katherine Bareford
(74) *Attorney, Agent, or Firm*—William Scott Andes; Armstrong Teasdale LLP

(57) ABSTRACT

A method for masking at least one turbine engine component wherein the method includes providing at least one masking member, securing each masking member to the at least one turbine engine component, and applying a metal coating to the at least one turbine engine component.

15 Claims, 3 Drawing Sheets

METHODS AND APPARATUS FOR MANUFACTURING TURBINE ENGINE COMPONENTS

BACKGROUND OF THE INVENTION

This invention relates generally to turbine engines, and, more particularly, to methods and apparatus for manufacturing turbine engine components.

Known turbine engines include a compressor for compressing air which is suitably mixed with a fuel and channeled to a combustor wherein the mixture is ignited for generating hot combustion gases. The gases are channeled to a turbine, which extracts energy from the combustion gases for powering the compressor, as well as producing useful work for propelling an aircraft in flight and for powering a load, such as an electrical generator.

To shield components from the high temperatures generated within the engine, at least some known components exposed to the gas flow path are coated with a metal coating, such as a thermal barrier coating (TBC). More specifically, thermal barrier coating is typically applied with a spraying process, and often only after the components have been grit blasted. However, the application of thermal barrier coating may actually adversely affect or limit the performance of some components exposed to the gas flow path, such as, for example, seal teeth used with rotating seal assemblies.

To ensure that metal coating is not applied to such components, at least some spraying processes require that such components are masked prior to the metal coating being applied, and then unmasked after the metal coating has been applied. More specifically, such components are typically masked using a durable adhesive-backed tape, such as glass-filled masking tape. However, such a process may be a time-consuming and labor-intensive task. Furthermore, generally the tape is not reusable after being removed from the components.

BRIEF DESCRIPTION OF THE INVENTION

In one aspect, a method for assembling at least one turbine engine component including a plurality of seal teeth is provided. The method comprises coupling a masking member to the at least one turbine engine component such that the masking member extends between adjacent seal teeth, applying a metal coating to the at least one turbine engine component, such that the masking member prevents contact between a portion of the plurality of seal teeth and the metal coating, and removing the masking member from the at least one engine component.

In another aspect of the invention, a method for decreasing a heat induced to a turbine engine component is provided. The turbine engine includes a plurality of seal teeth separated by at least one channel. The method comprises positioning a masking member within the at least one channel such that the masking member extends in substantial sealing contact across the channel and between the seal teeth, and applying a metal coating to the at least one turbine engine component, such that the masking member prevents contact between a portion of the plurality of seal teeth and the metal coating.

In a further aspect, a method for applying a metal coating to a turbine engine is provided. The method comprises coupling a masking member to at least one turbine engine component that includes a plurality of seal teeth, such that the masking member extends through a channel defined between adjacent seal teeth, and applying a metal coating within the turbine engine such that the masking member prevents contact between the seal teeth channel and the metal coating.

DETAILED DESCRIPTION OF THE INVENTION

Figure 1:
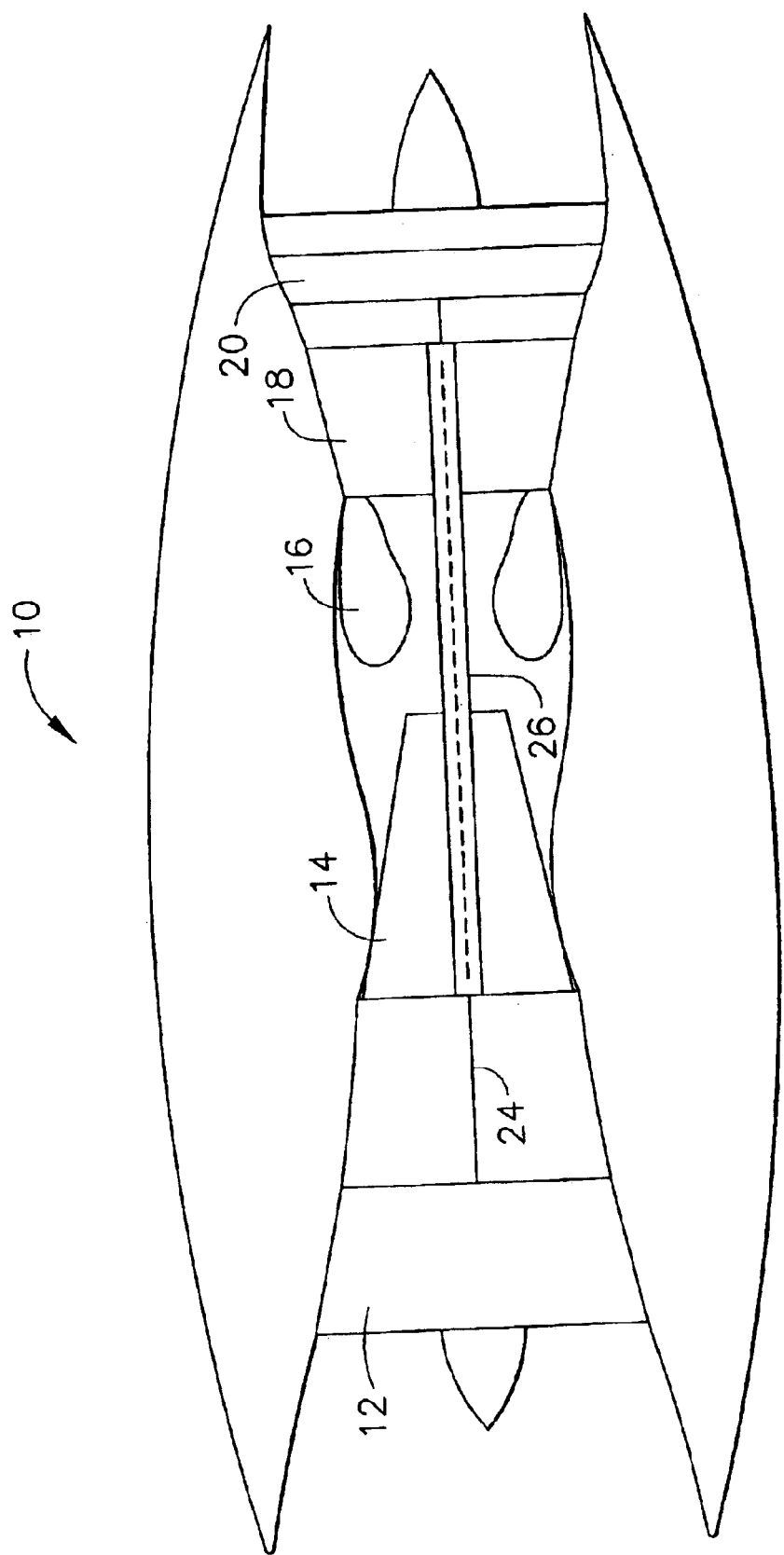
FIG. 1 is schematic illustration of a gas turbine engine.

FIG. 1 is a schematic illustration of a gas turbine engine 10 including a low pressure compressor 12, a high pressure compressor 14, and a combustor 16. Engine 10 also includes a high pressure turbine 18 and a low pressure turbine 20. Compressor 12 and turbine 20 are coupled by a first shaft 24, and compressor 14 and turbine 18 are coupled by a second shaft 26. In one embodiment, the gas turbine engine is a GE90 available from General Electric Company, Cincinnati, Ohio.

In operation, air flows through low pressure compressor 12 and compressed air is supplied from low pressure compressor 12 to high pressure compressor 14. The highly compressed air is delivered to combustor 16. Airflow from combustor 16 drives turbines 18 and 20 before exiting gas turbine engine 10.

Figure 2:
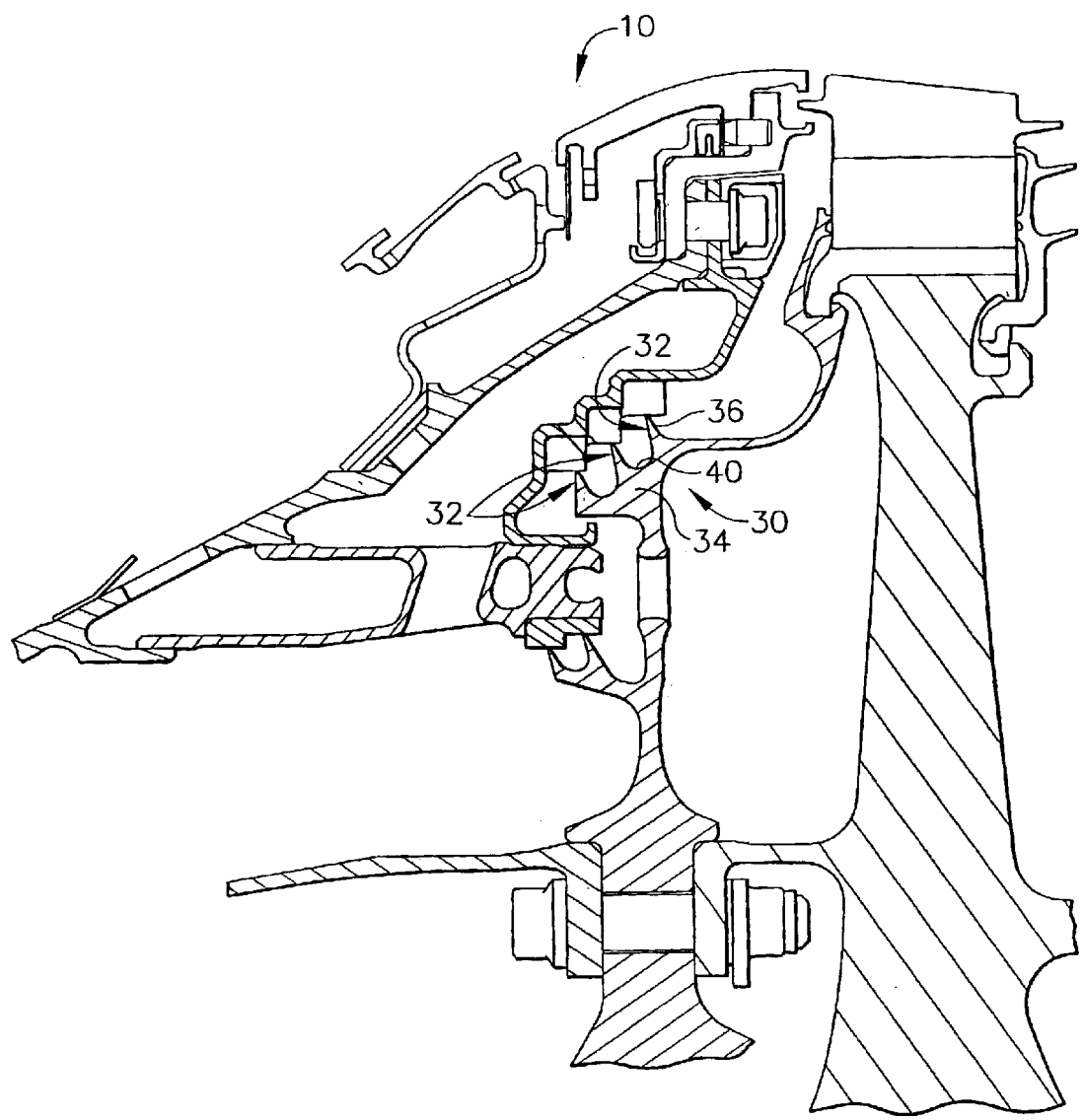
FIG. 2 is a cross-sectional illustration of an exemplary seal that may be used with the gas turbine engine shown in FIG. 1.
Figure 3:
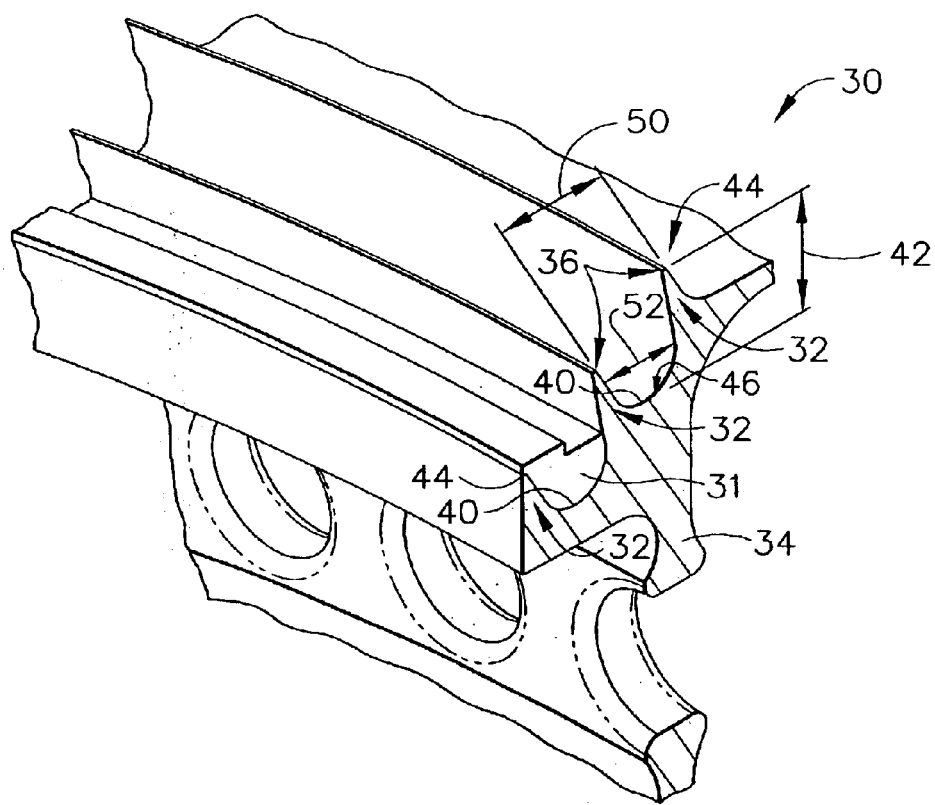
FIG. 3 is a partial perspective view of the seal shown in FIG. 2 including an exemplary masking member coupled thereto.
Figure 4:
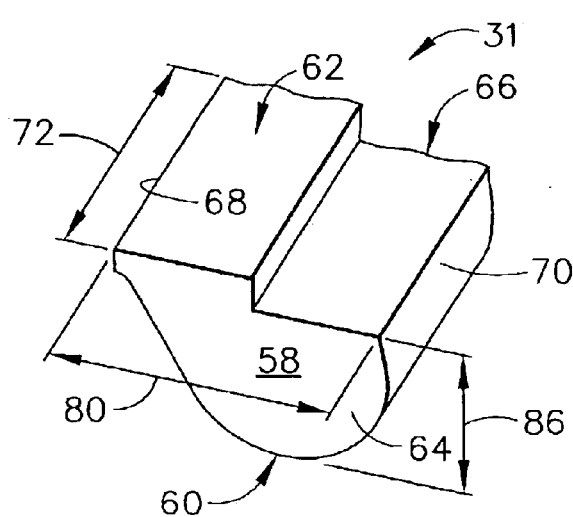
FIG. 4 is a partial perspective view of an exemplary masking member that may be used with the seal shown in FIG. 3.

FIG. 2 is a cross-sectional illustration of an exemplary known seal 30 that may be used with gas turbine engine 10. FIG. 3 is a partial perspective view of seal 30 including an exemplary masking member 31 coupled thereto. FIG. 4 is a partial perspective view of masking member 31. Seal 30 includes a plurality of seal teeth 32 that extend radially outwardly from a seal body 34. Seal teeth 32 are arranged in axially-spaced rows 36 that extend circumferentially within engine 10. In the exemplary embodiment, seal 30 includes three rows 36 of annular seal teeth 32.

A channel 40 is formed between adjacent seal teeth 32. More specifically, channel 40 has a depth 42 measured from a tip 44 of seal teeth 32 to a radially inner surface 46 of channel 40, and has a width 50 measured between adjacent seal teeth sidewalls 52. In the exemplary embodiment, channel 40 has a substantially U-shaped cross-sectional profile. In one embodiment, seal 30 is a forward outer seal. In another embodiment, seal 30 is a compressor discharge pressure seal. Alternatively, seal 30 is any seal including at least one channel defined between adjacent seal teeth.

In the exemplary embodiment, masking member 31 includes a body 58 including a radially inner wall 60 and an oppositely-disposed radially outer wall 62 that are connected by a pair of oppositely-disposed sidewalls 64 and 66 and by a pair of radial edges 68 and 70. Sidewalls 64 and 66 define ends for masking member 31 and a length 72 of masking member 31 is measured between sidewalls 64 and 66. Masking member length 72 is variably selected depending on the seal member 30 being masked, and such that length 72 is slightly shorter than a circumferential length defined by seal channel 40.

A width 80 of masking member 31 is measured between sidewalls 68 and 70. Masking member width 80 is variably selected depending on a seal channel width 50 of a seal 30 being masked. More specifically, masking member width 80 is substantially equal to, or slightly larger than, a width of channel 40. A thickness 86 of masking member 31 is measured between walls 60 and 62, and is variably selected depending on a depth 42 seal 30 being masked.

A cross-sectional shape of body 58 is variably depending on a seal 30 being masked. More specifically, as described in more detail below, a shape of body 58 is selected to facilitate substantially sealing channel 40. For example, in one embodiment, body 58 is substantially semi-circular. In another embodiment, is substantially semi-elliptical. Although masking member 31 is herein described and illustrated in the exemplary manner, it should be understood that the particular geometry and cross-sectional shape of member 31, will vary depending on the particular configuration and geometrical shape of seal 30. The embodiment illustrated is intended as exemplary, and is not intended to limit the geometry and cross-sectional shape of member 31 or seal 30.

Masking member 31 is fabricated material that enables member 31 to be flexible and stretchable along length 72. For example, in the exemplary embodiment, masking member 31 is fabricated from extruded silicone rubber. The extruded silicone rubber is then cut to a desired length 72.

To shield engine components from high temperature generated therein, components exposed to the high temperatures may be coated with a metal coating, such as but not limited to thermal barrier coating (TBC). The metal coating may either facilitate reducing heat transfer into the components, which may permit the engine to operate with an increased operating temperature for increasing an efficiency of the engine, and/or providing wear resistance to the components being coated. As described in more detail below, masking member 31 prevents an undesirable build-up of metal coating from forming within seal channel 40 as the metal coating is applied to components adjacent seal 30.

Specifically, before the metal coating is applied, and before any components adjacent seal 30 are grit-blasted, masking member 31 is coupled to seal 30 to facilitate preventing at least a portion of seal 30 from being grit blasted and/or sprayed with metal coating. More specifically, initially a desired length 72 of masking member 31 is cut from an extruded length of masking member material. Masking member 31 is then inserted within a desired seal channel 40 to be shielded. Because member 31 is pliable, and because seal channel 40 may be tapered, masking member 31 may be forcibly inserted within channel 40 such that masking member 31 extends across channel 40 and is substantially flush against at least a portion of each adjacent seal tooth sidewall 52. In one embodiment, a sealant is applied to channel 40 before masking member 31 is inserted within channel 40. In one embodiment, the sealant is a silicone rubber commercially available from Shercon, Inc., Santa Fe Springs, Calif. In another embodiment, the sealant is a silicone rubber commercially available from Cynflex, Ltd, Nottinghamshire, U.K.

Masking member 31 is then stretched circumferentially around channel 40 such that masking member first end 64 is adjacent masking member second end 66. First end 64 is then coupled to second end 66. In one embodiment, heating the sealant facilitates coupling the first and second ends 64 and 66, respectively, together. In another embodiment, a vulcanizing process is used to couple first end 64 to second end 66. In a further embodiment, a molding process is used to couple first end 64 to second end 66. Stretching masking member 31 facilitates forcing masking member 31 radially inwardly towards channel inner surface 46 such that sealing member body 58 is plastically deformed against seal teeth 32 and in sealing contact with seal teeth sidewalls 52.

A metal coating is then applied through spraying to the engine components adjacent seal 30. In one embodiment, the metal coating is a thermal coating such as, but not limited to, thermal barrier coating (TBC). In another embodiment, the metal coating is a wear-resistant coating. Masking member 31 facilitates preventing contact between seal channel 40 and the thermal barrier coating, and thus prevents the metal coating from being undesirably deposited within channel 40. Furthermore, if seal 30 or any engine component are grit blasted, masking member 31 facilitates shielding channel 40 from the abrasive material sprayed during the grit blasting. In addition, because masking member 31 is pliable, following the application of the metal coating, or the application of the grit blasting, masking member 31 is removed and may be reused. More specifically, once removed, masking member 31 returns to its original shape.

The above-described methods for manufacturing engine components are cost-effective and highly reliable. More specifically, the masking member allows a plurality of seal configurations to be quickly masked in an efficient and timely manner, resulting in reduced manufacturing costs. Furthermore, the masking member facilitates improving the quality and repeatability of the masking of components in a cost-effective and reliable manner.

Exemplary embodiments of seal assemblies and masking members are described above in detail. The assemblies and members are not limited to the specific embodiments described herein, but rather, components of each assembly may be utilized independently and separately from other components described herein. Each masking member can also be used in combination with other seal assembly components.

While the invention has been described in terms of various specific embodiments, those skilled in the art will recognize that the invention can be practiced with modification within the spirit and scope of the claims.

What is claimed is:

1. A method for assembling at least one turbine engine component including a plurality of seal teeth, said method comprising:

coupling a masking member to the at least one turbine engine component such that the masking member extends between adjacent seal teeth, wherein said coupling the masking member to the at least one turbine engine component further comprises:
coupling the masking member having a first end and a second end to the seal teeth; and
coupling the first end of the masicing member to the second end of the masking member;

applying a metal coating to the at least one turbine engine component, such that the masking member prevents contact between a portion of the plurality of seal teeth and the metal coating; and removing the masking member from the at least one engine component.

2. A method in accordance with claim 1 wherein coupling a masking member to the at least one turbine engine component further comprises coupling a masking member formed from a rubber material to the at least one turbine engine component.

3. A method in accordance with claim 1 wherein coupling the first end of the masking member to the second end of the masking member further comprises coupling the first end to the second end by at least one of vulcanizing and molding.

4. A method in accordance with claim 1 wherein the plurality of seal teeth extend circumferentially, wherein coupling a masking member to the at least one turbine engine component further comprises coupling a masking member having a length measured between a first end and a second end that is shorter than a circumferential length defined by the engine component.

5. A method in accordance with claim 4, wherein coupling a masking member to the at least one turbine engine component further comprises stretching the masking member to couple the masking member first end to the masking member second end.

6. A method in accordance with claim 1 wherein coupling a masking member to the at least one turbine engine component further comprises:
    applying a sealant between the masking member and the at least one turbine engine component; and
    applying heat to the masking member to securely couple the masking member in position relative to the at least one turbine engine component.

7. A method for decreasing a heat induced to a turbine engine component, the turbine engine including a plurality of seal teeth separated by at least one channel, said method comprising:
    positioning a masking member within the at least one channel such that the masking member extends in substantial sealing contact across the channel and between the seal teeth, wherein said positioning the masking member within the at least one channel further comprises:
        coupling the masking member fabricated from a rubber material within the seal teeth channel;
        coupling a first end of the masking member to a second end of the masking member; and
    applying a metal coating to the at least one turbine engine component, such that the masking member prevents contact between a portion of the plurality of seal teeth and the metal coating.

8. A method in accordance with claim 7 wherein coupling a first end of the masking member to a second end of the masking member further comprises coupling the masking member first end to the second end by at least one of vulcanizing the ends together, and molding the ends together.

9. A method in accordance with claim 7 wherein positioning a masking member within the at least one channel further comprises positioning a masking member within the at least one channel that has a length that is shorter than a length of a circumference defined by the at least one channel.

10. A method in accordance with claim 9 wherein positioning a masking member within the at least one channel further comprises stretching the masking member to couple a first end the masking member to a second end of the masking member.

11. A method in accordance with claim 7 further comprising applying a sealant between the masking member and the at least one channel.

12. A method for applying a metal coating to a turbine engine, said method comprising:
    coupling a masking member to at least one turbine engine component that includes a plurality of seal teeth, such that the masking member extends through a channel defined between adjacent seal teeth, said coupling the masking member to the at least one turbine engine component further comprises:
    coupling the masking member fabricated from a silicone rubber material within the channel
    coupling a first end of the masking member to a second end of the masking member by applying heat to the masking members to couple the ends together; and
    spraying the metal coating within the turbine engine such that the masking member prevents contact between the seal teeth channel and the metal coating.

13. A method in accordance with claim 12 wherein coupling a masking member to at least one turbine engine component further comprises coupling a masking member fabricated from an extruded material.

14. A method in accordance with claim 12 wherein coupling a masking member to at least one turbine engine component further comprises applying a sealant to the channel prior to coupling the masking member to the channel.

15. A method in accordance with claim 12 further comprising removing the masking member from the channel after the metal coating is applied.

* * * * *